(12) United States Patent
Zhang et al.

(10) Patent No.: US 7,730,781 B2
(45) Date of Patent: Jun. 8, 2010

(54) GAS PENDULUM INERTIAL SENSOR

(75) Inventors: Fuxue Zhang, Beijing (CN); Wei Zhang, Beijing (CN)

(73) Assignee: Beijing Walkang Science & Technology Limited Company, Zhaoyang District, Beijing (CN)

( * ) Notice: Subject to any disclaimer, the term of this patent is extended or adjusted under 35 U.S.C. 154(b) by 341 days.

(21) Appl. No.: 11/906,206

(22) Filed: Sep. 29, 2007

(65) Prior Publication Data
US 2008/0295591 A1  Dec. 4, 2008

(30) Foreign Application Priority Data
Jun. 1, 2007  (CN) ..................... 2007 1 0105848

(51) Int. Cl.
*G01P 9/00* (2006.01)
*G01P 15/08* (2006.01)
(52) U.S. Cl. .................. 73/504.03; 73/504.06
(58) Field of Classification Search .............. 73/504.06, 73/504.03, 514.07, 514.13, 514.12, 514.05, 73/514.06
See application file for complete search history.

(56) References Cited

U.S. PATENT DOCUMENTS

| 4,020,700 A | * | 5/1977 | Lopiccolo et al. ......... 73/504.06 |
| 4,361,054 A | * | 11/1982 | Bailey ....................... 74/5.6 D |
| 5,641,903 A | * | 6/1997 | Shinotuka et al. ......... 73/204.18 |
| 5,780,738 A | * | 7/1998 | Saunders ................. 73/504.06 |

* cited by examiner

*Primary Examiner*—Helen C. Kwok

(57) ABSTRACT

The present invention relates to a gas pendulum inertial sensor, which is used in control technology field to detect pose measurement of motional body, such as ship craft and robot, wherein the inertial sensor main includes a gas pendulum angular velocity sensing element, a gas pendulum tilt sensing element and a signal process circuit, wherein the signal process circuit mainly comprises a bridge circuit, a amplify circuit, a filter circuit, and a SCM compensation circuit with a null position and sensitivity compensation program, a linearity and output compensation program, an acceleration interference offset subprogram, and an omnibearing tilt signal compensation program, whereby the SCM compensation circuit integral into a circuit board to replace a conventional hardware signal amplify circuit, a filter circuit and a compensation circuit. The gas pendulum inertial sensor is adapted to accurately measure not only an object's indication without interference from the acceleration, but also an object's indication with interference from the acceleration. The gas pendulum inertial sensor has some significant advantages like highly attack-resist ability, intensively vibrate-resist ability, quick response time, wide ranges of working temperature, well linearity, credibility, sensitivity and precision ability, compact capacity and lower cost.

20 Claims, 12 Drawing Sheets

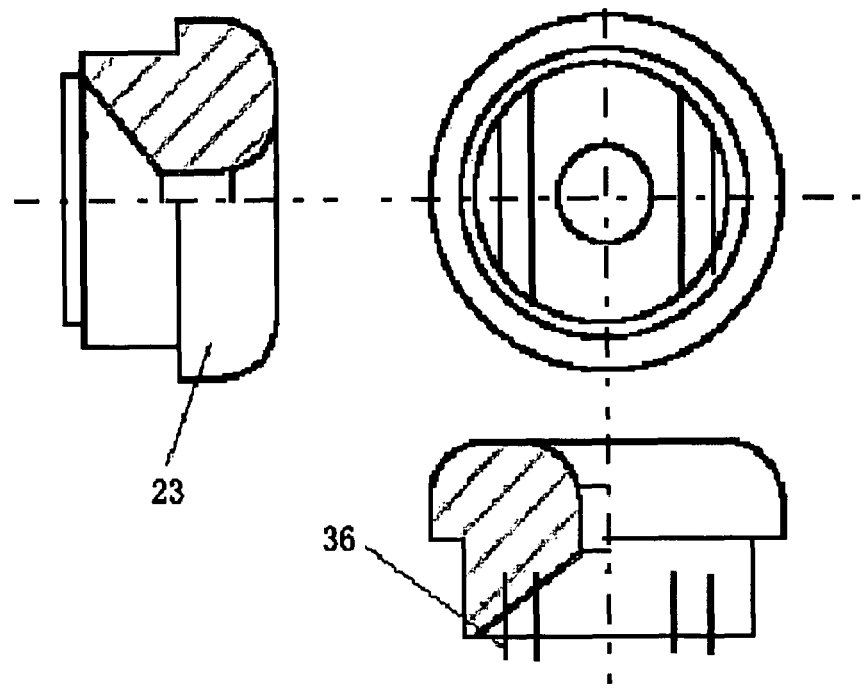
FIG.15
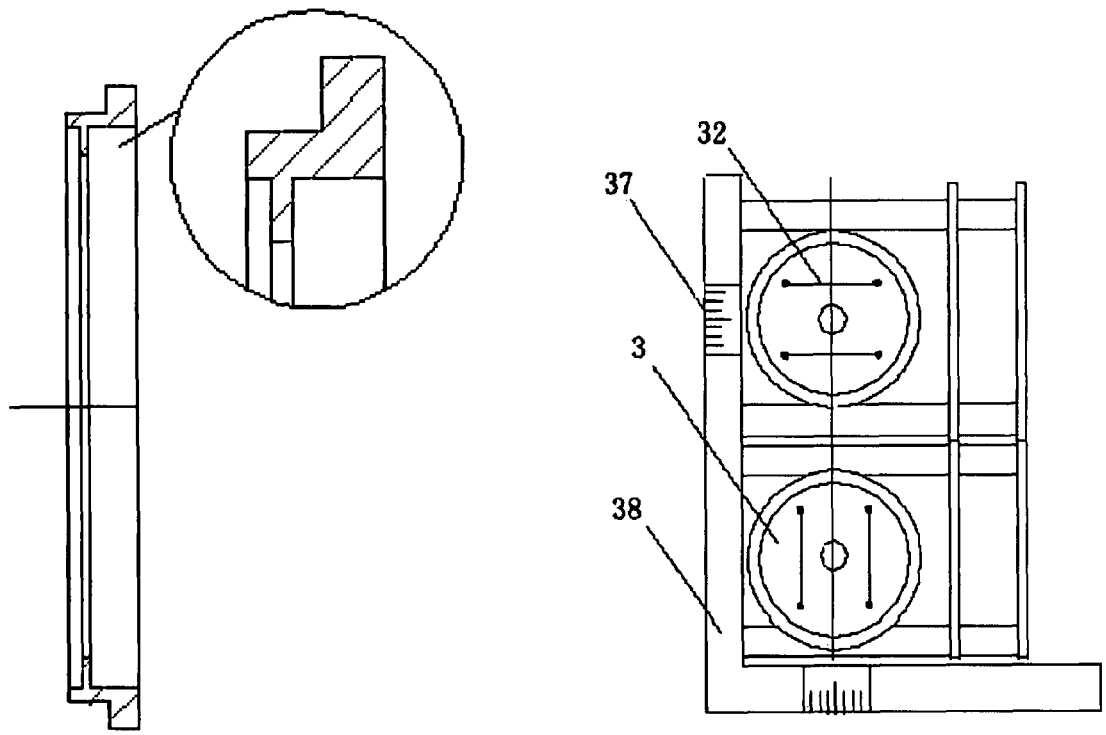

GAS PENDULUM INERTIAL SENSOR

BACKGROUND OF THE PRESENT INVENTION

1. Field of Invention

The present invention relates to an gas pendulum inertial sensor, which is used in control technology field to measure pose measurement of motional body, such as ship craft and robot, wherein the inertial sensor main includes a sensitive element and a signal process circuit.

2. Description of Related Arts

At present, in control technology field, motional body's pose measurement, such as tilt and acceleration, is usually made by sensors. The basic work principle of these sensors is that thermal current, solid and liquid pendulum under the effect of globe gravitation.

Referring to FIG. 1 and FIG. 2 of the drawings, basic operating principle of conventional pendulum horizontal pose sensor is illustrated. This sensor is connected to an object's measuring surface. If the object's measuring surface has a "θ" angle with respect to the horizontal surface, the pendulum bob m will maintainly point to the gravity direction under the effect of globe gravitation. At the same time, the pendulum bob m will has a "θ" angle with respect to the normal direction of the object's measuring surface. Then, the angle "θ" can be detected by a sensing element. However, the conventional pendulum horizontal pose sensor usually is used in a static statement. In a dynamic statement, due to interference of the acceleration, the conventional pendulum horizontal pose sensor can not be used for measuring a motional object's inclination. In a word, the conventional pendulum horizontal pose sensor has disadvantages like: the measuring surface' inclination only can be accurately measured without interference of the acceleration. In other word, when the object's measuring surface is in a moving statement, due to interference from the acceleration, the measurement of the conventional pendulum horizontal pose sensor will cause a terribly measurement error.

SUMMARY OF THE PRESENT INVENTION

A main object of the present invention is to provide an gas pendulum inertial sensor, which is adapted to accurately measure not only an object's indication without interference from the acceleration, but also an object's indication with interference from the acceleration.

Accordingly, in order to accomplish the above objects, the basic idea of the present invention is provided an inertial sensor combined an gas pendulum tilt sensor with an gas flow angular velocity gyroscope, wherein the gyroscope is used to offset interference from the acceleration to the horizontal pose sensor.

FIG. 3 of the drawings illuminates a perspective block diagram of the gas pendulum inertial sensor, which is able to offset interference from the acceleration. The gas pendulum inertial sensor comprises an gas pendulum horizontal pose sensor, an gas flow angular velocity gyroscope and a signal process circuit. The main work process is: firstly, the gas pendulum horizontal pose sensor outputs a signal, the signal is amplified by an amplifier becomes an output signal $V_{f\theta}$, Secondly, the output signal $V_{f\theta}$ accesses into a differentiator. Then, both of the output signal from the differentiator and the output signal from the gas flow angular velocity gyroscope access into a comparator A. The signal from the comparator is an interference signal created by the acceleration. The signal from the comparator accesses into an integrator. The output signal $V_a$ out of the integrator, after filtered by a high flux wave filter, becomes an output signal $V'_a$. The signal $V'_a$ and the signal $V_{f\theta}$ are sent to a comparator B. Hence, a tilt signal $V_\theta$ is achieved to offset interference from the acceleration. Additional, an angular velocity signal also is given by the gas pendulum inertial sensor.

The signal outputs in a dummy voltage type, without the interference from the acceleration, the relationship between the tilt signal $V_\theta$ from the indication (θ) and the angular velocity $V_\omega$, from the angular velocity (ω) is:

$$V_\theta = V_{0_\theta} + K_\theta \theta \quad (1)$$

$$V_\omega = V_{0_\omega} + K_\omega \omega \quad (2)$$

In above equation, $V_{0_\theta}$ is a null position dummy voltage of the indication, $V_{0_\omega}$ is a null position dummy voltage of the angular velocity dummy voltage, $K_\theta$ is a proportion factor of the indication, and $K_\omega$ is a proportion factor of the angular velocity.

A dummy voltage equation of offset interference from the acceleration to the horizontal pose sensor, as shown in FIG. 3 of the drawings, is deduced as follows:

$$V_\theta = V_{\theta_0} + (V_\omega - V_{0_\omega}) \cdot m \cdot t \cdot n$$

In above equation, n is a number of discrete areas of the moving time of the sensor, t is a moving time, and $$\frac{K_\theta}{K_\omega} = m.$$

from above equation, treated by the interference inhibit program, the interference from the acceleration is offset.

The present invention has some significant advantages like: first of all, the interference from the acceleration to the sensor is effectively offset so that an accurately measuring signal of the horizontal pose measurement of a static or motional object is achieved. At the same time, an angular velocity signal can be achieved from the sensor. Then, the present invention has some other significant advantages like highly attack-resist ability, intensively vibrate-resist ability, quick response time, wide ranges of working temperature, well linearity, credibility, sensitivity and precision ability, compact capacity and lower cost.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 15 is a cross section view of a nozzle of the two dimension gas flow angular velocity gyroscope according to above present invention.

Figure 1:
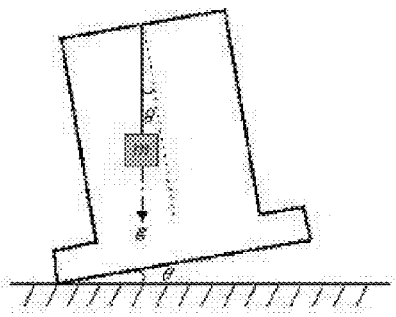
FIG. 1 is a basic operating principle diagram of a conventional pendulum horizontal pose sensor.
Figure 2:
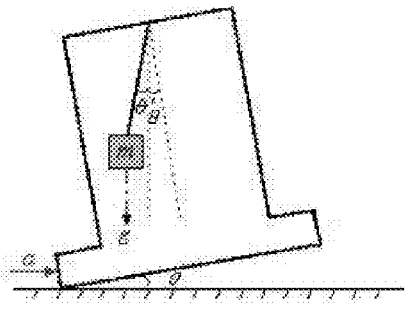
FIG. 2 is a diagrammatic sketch illuminates the interference from the acceleration to the conventional pendulum horizontal pose sensor.
Figure 3:
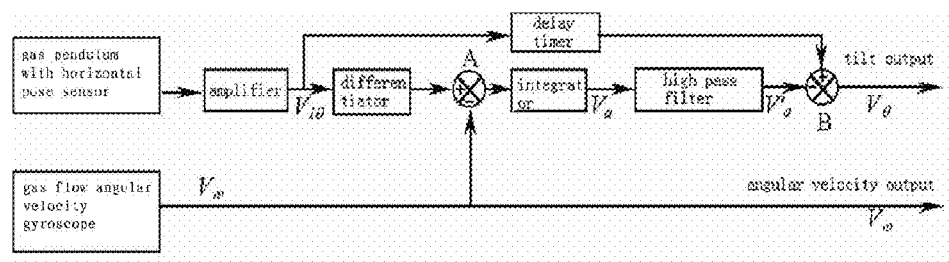
FIG. 3 is a whole construction diagram of an gas pendulum inertial sensor according to a preferred embodiment of the present invention.

The numbers shown in the drawings represent as follows:
1—base; 2—housing; 3—gas flow angular velocity sensing element; 4—gas pendulum tilt sensing element; 5—signal process circuit; 7—bottom plate; 6—plug; 8—small locker; 9—small press plate; 10—small sealed ring; 11—top cap; 12—nozzle body; 13—gas inlet valve; 14—heat—variable plug; 15—pump bracket; 16—pump base; 17—disk spring; 18—big sealed ring; 19—big press plate; 20—big press plate; 21—fasten nut; 22—gas outlet valve; 23—nozzle; 24—positioning key; 25—sealed channel; 26—gas inlet 27—gas outlet; 29—piezoelectric pump; 30—sensing base; 31—sensing body; 32—heat wire; 33—working gas; 34—X—axis angular velocity sensing element; 35X—axis angular velocity sensing element; 36—disk piece; 37—positioning line; 38—L-shaped positioning base; 39—sealed chamber; 40—chamber body; 41—chamber cap; 42—insulator; 43—detecting wire; 44—heating wire; 45—gravity weight line

DETAILED DESCRIPTION OF THE PREFERRED EMBODIMENT

Figure 4:
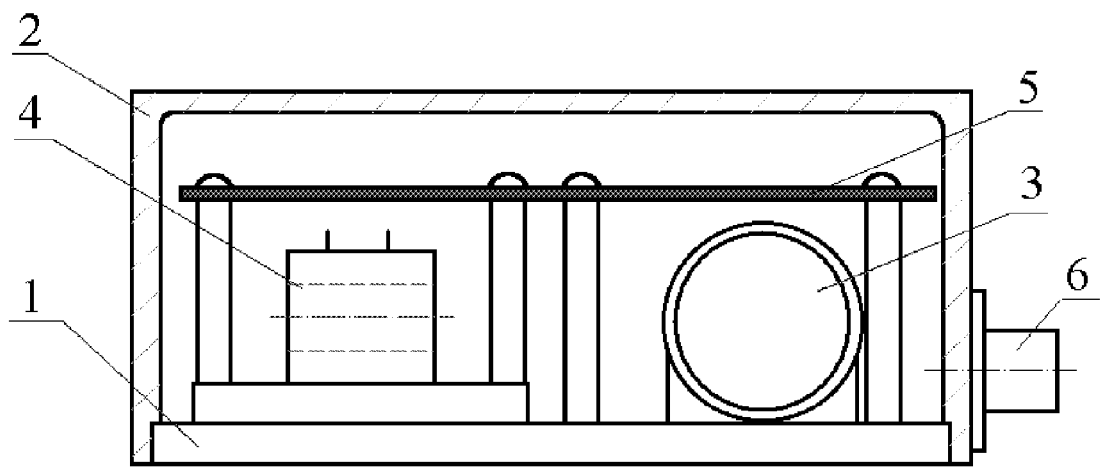
FIG. 4 is a perspective view of the gas pendulum inertial sensor according to above preferred embodiment of the present invention.

Referring to FIG. 4 of the drawings, an gas pendulum inertial sensor, according to a preferred embodiment of the present invention is illustrated. The gas pendulum inertial sensor comprises a base 1, a housing 2, an gas flow angular velocity sensing element 3, an gas flow tilt sensing element 4, a signal process circuit 5 and a plug 6.

Figure 10:
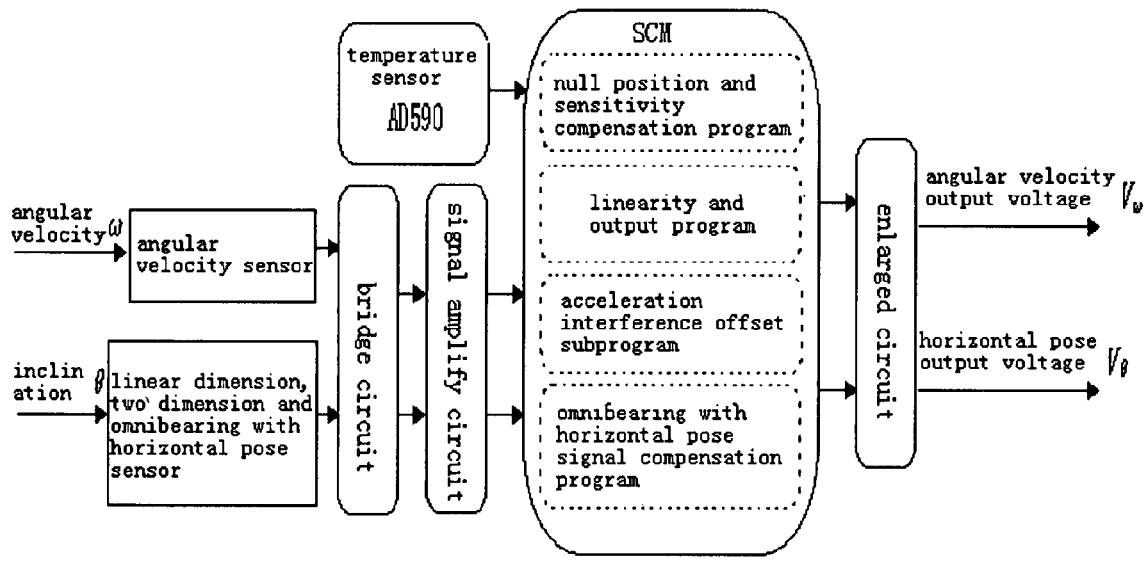
FIG. 10 is a block diagram of a signal process circuit of the gas pendulum inertial sensor according to above preferred embodiment of the present invention.

Referring to FIG. 10 of the drawings, the signal process circuit mainly comprises a bridge circuit, a signal amplify circuit, a filter circuit, and a SCM compensation circuit. The horizontal pose output comprises a linear dimension output, a two dimension output, an omnibearing tilt output. The SCM compensation circuit comprises a null position and sensitivity compensation program, a linearity and output compensation program, an acceleration interference offset subprogram, and an omnibearing tilt signal compensation program. Different SCM compensation circuits are used in different sensors. For further enhancing the performance of the present invention, the null position and sensitivity compensation program and the linearity and output compensation program of the SCM compensation circuit of the signal process circuit of the gas pendulum horizontal pose sensor are sharing with the an angular velocity gyroscope. When the gas pendulum horizontal pose sensor is combined to a motional body, an acceleration interference offset subprogram is provided in the SCM. An omnibearing signal compensation subprogram is provided in the SCM for achieving an omnibearing horizontal pose measurement. For reducing volume, eliminating impaction from these independent elements, and reducing zero shift error, a C8057F350 SCM, substitute for conventional signal amplify circuit, filter circuit and compensation process, is used to execute amplification, filtration, and data compensation process. In this way, these conventional four circuits are replaced by the SCM circuit so that the sensor volume is reduced by 50%, and the zero shift is reduced by 80%. Shown from experiments, after the compensation program, the non-linearity is decreased to less than or equal to 0.5%, the sensitivity variation is decreased to less than or equal to 0.6%, the work temperature range is −40° C.~+55° C., and the inhibit ability to interference of the acceleration is raised to more than 95%. Thus, the whole performance of the inertial sensor is notably improved (shown in Chart. 1). In the present invention, the two expressions "tilt" and "horizontal pose" are sometimes alternative.

CHART 1

Main performance indictors of gas pendulum inertial sensor

| Measure Range | | Distinguish Ability | | Ratio Quotient | | Non-Linearity (% FS) | Response Time (ms) | Working Temperature (° C.) | Inhibit Ability for Acceleration Inference |
|---|---|---|---|---|---|---|---|---|---|
| Inclination | Angular velocity | Inclination | Angular velocity | Inclination | Angular velocity | | | | |
| ±30° | ±30°/S | 0.01° | 0.01°/S | 150 mV/° | 40 mV/°/S | ≦1% | ≦100 | −45~65 | >95% |

Figure 5:
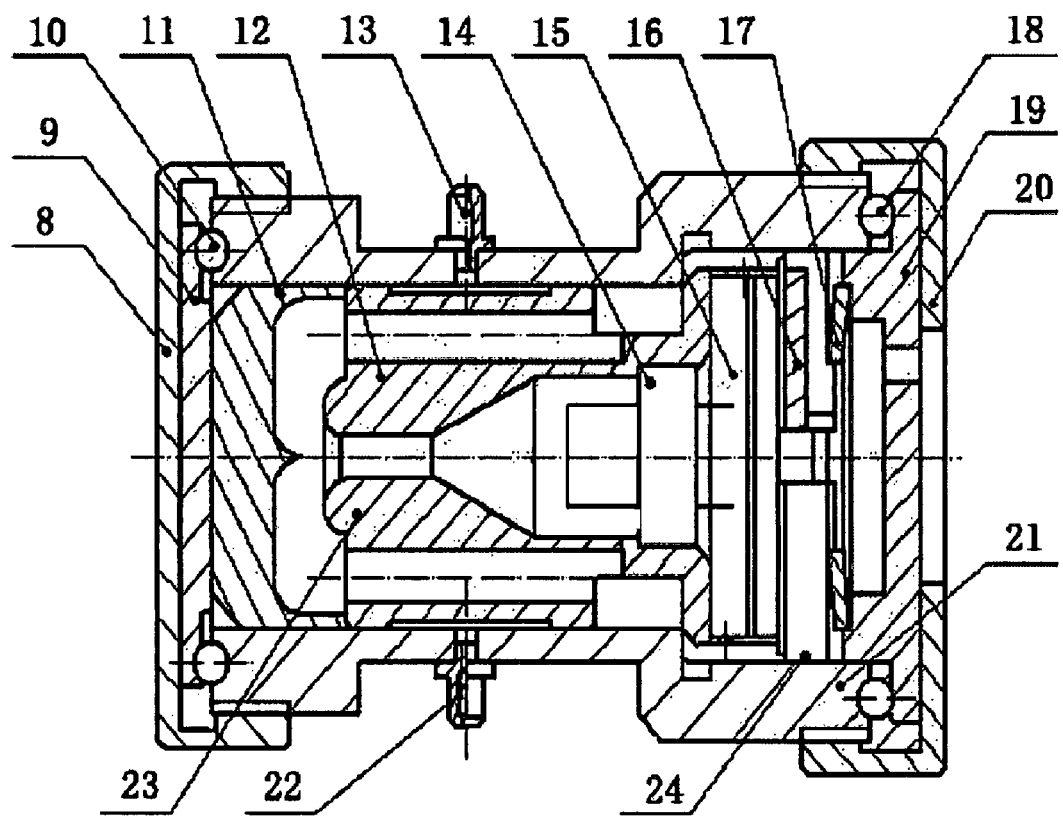
FIG. 5 is a cross section view of an angular velocity sensing element of the gas pendulum inertial sensor according to above preferred embodiment of the present invention.
Figure 6:
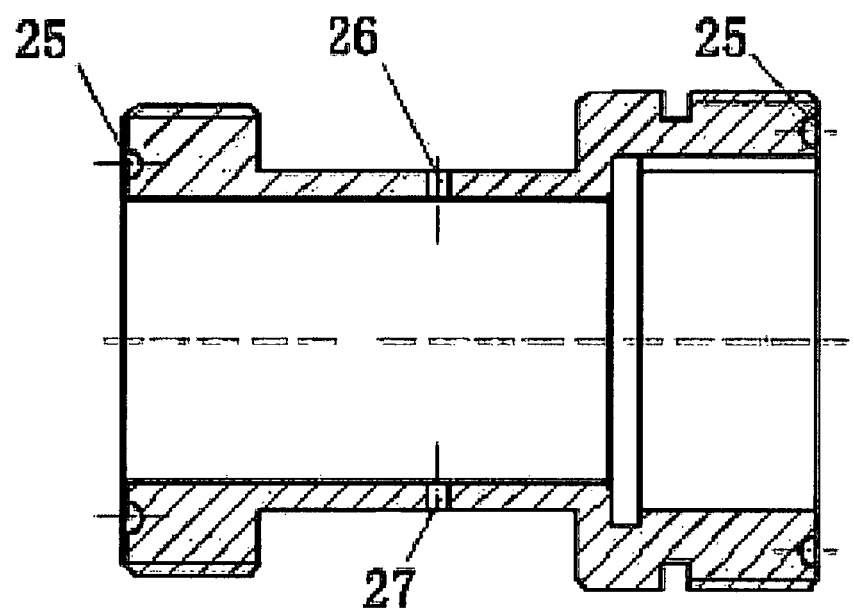
FIG. 6 is a cross section view of a housing of the angular velocity sensing element of the gas pendulum inertial sensor according to above preferred embodiment of the present invention.

The gas flow angular velocity sensing element, which is the key element of the gas pendulum inertial sensor, as shown in FIGS. 5 and 6, comprises a top cap, a positioning key, a disk spring, a pump base, a pump bracket, a piezoelectric pump (comprising a piezoelectric ceramics twin lamella attached to the pump bracket), a heat-variable plug, a nozzle body, a nozzle and a housing.

Figure 7:
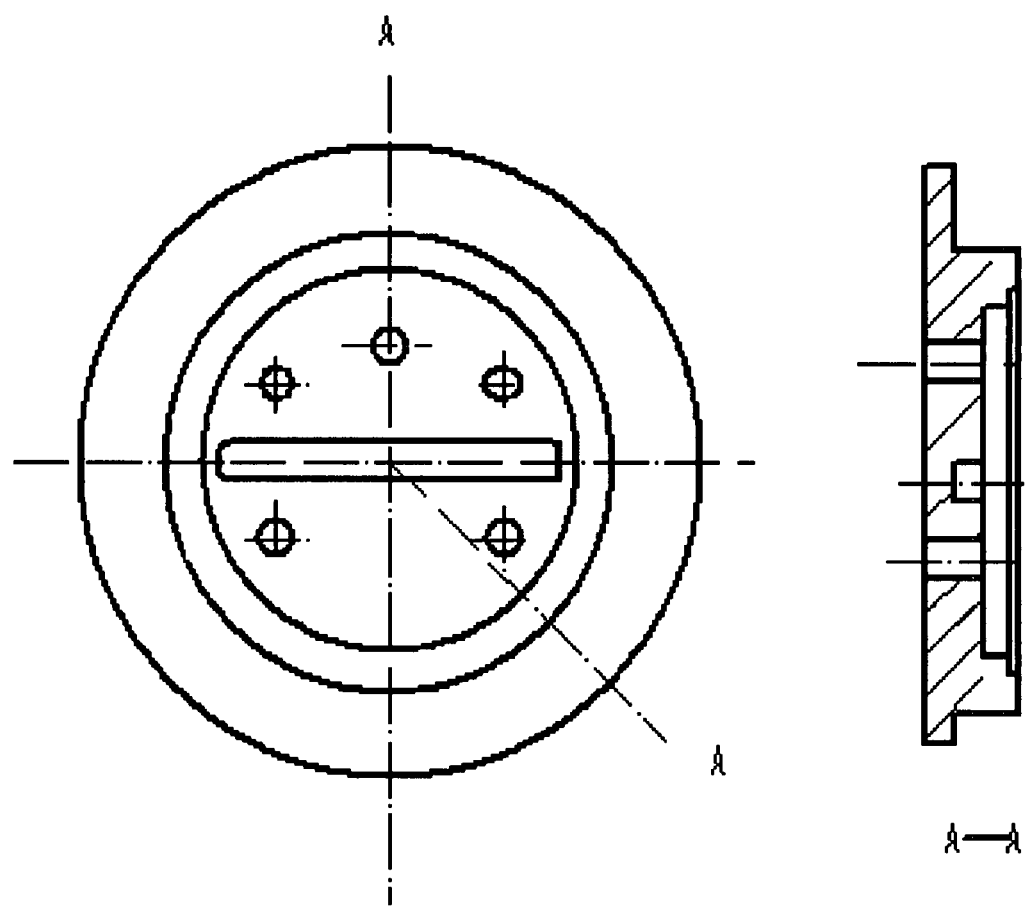
FIG. 7 is a frontal view of a press plate of the gas pendulum inertial sensor according to above preferred embodiment of the present invention.
Figure 8:
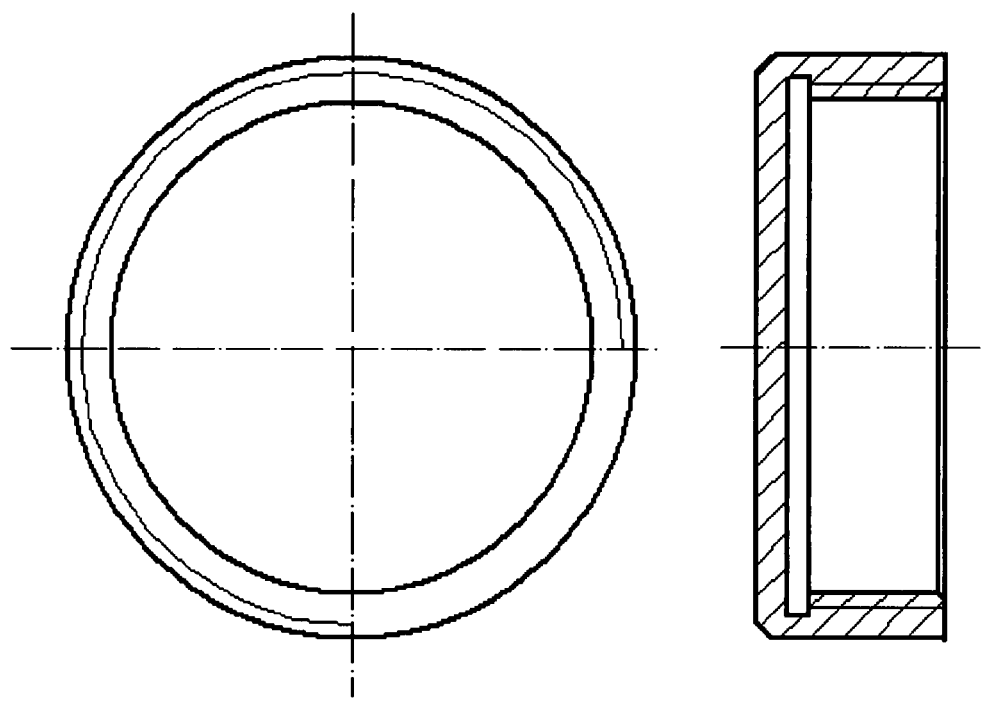
FIG. 8 is a cross section view of a locker of the gas pendulum inertial sensor according to above preferred embodiment of the present invention.
Figure 9:
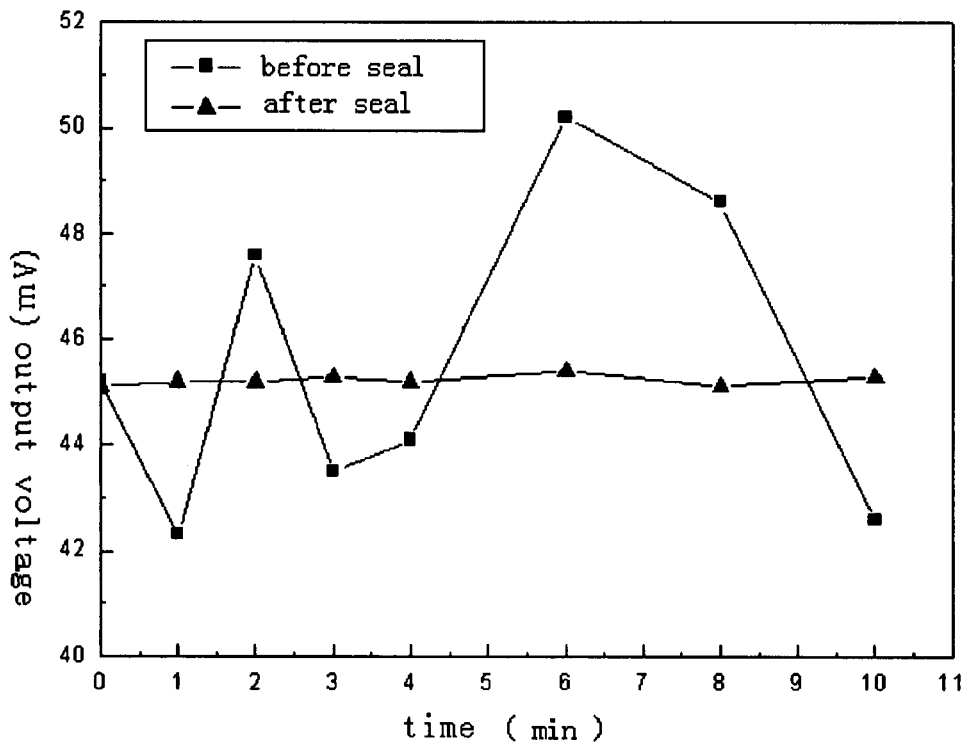
FIG. 9 is a diagram illustrates vary procedure of an output voltage signal from a gyroscope sensor follow time when the angular velocity is 10°/s.

For effectively reducing the influence of the external environment to gas motion state in the sensing member and enhancing the sensor's stability, the present invention further comprises a pair of seal grooves provided at both sides of the housing of the gas flow angular velocity sensing element respectively, a "π" shaped press plate (shown in FIG. 7) closely mounted on each of the pair of seal grooves. A pair of seal rings is respectively placed between the seal grooves and the "π" shaped press plates for achieving better seal effect. Moreover, a pair of lockers (shown in FIG. 8) is provided to closely press on the press plate. Therefore, the working gas is perfectly sealed in the gas flow angular velocity sensing element. As shown in FIG. 9, when the angular velocity of the gas flow angular velocity sensing element is 10°/s, the output voltage of the gyro changes with time. From the FIG. 9, we can learn that the sensor's stability is greatly enhanced.

Referring to FIG. 5 and FIG. 6 of the drawings, the housing of the gas flow angular velocity sensing element is in a double gas valve structure. The housing comprises an gas inlet and an gas outlet respectively provided on both sides of the housing, wherein a gas inlet valve is mounted at the gas inlet and a gas outlet valve is mounted at the gas outlet. The working process is that, firstly, evacuate the gas flow angular velocity sensing element by the gas outlet valve to make the gas flow angular velocity sensing element in a vacuum state. Then, open the gas inlet valve to introduce dry and pure gas, through a purging room, into the gas flow angular velocity sensing element. In this way, the sensitivity of the working gas is twice as before, and the zero shift is reduced by 80%.

The angular velocity gyroscope used in the present invention comprises a linear dimension angular velocity gyroscope and a two dimension angular velocity gyroscope.

Figure 11:
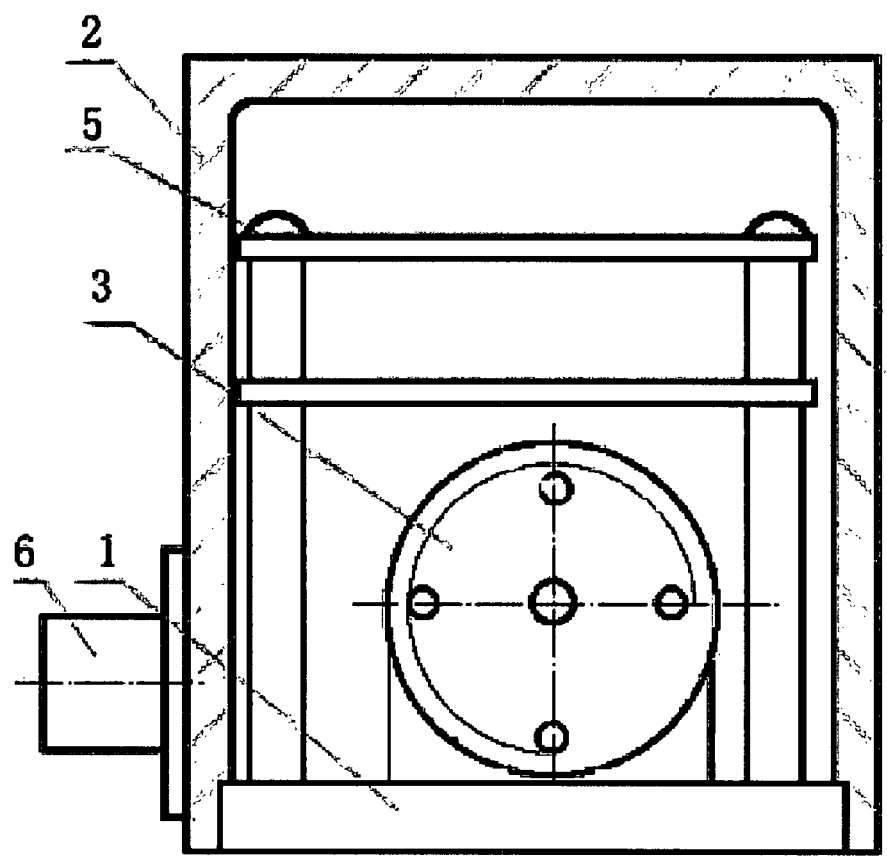
FIG. 11 is a perspective view of a linear dimension angular velocity gyroscope according to above present invention.

The linear dimension angular velocity gyroscope mainly comprises an angular velocity sensing element 3, a signal process circuit 5, a housing 2, a plug 6 and a base 1, as shown in FIG. 11. The signal process circuit mainly comprises a bridge circuit, an amplify circuit, a filter circuit, and a SCM compensation circuit. Once an angular velocity signal is input, the angular velocity signal is transferred to a voltage signal. The voltage signal is amplified by the amplify circuit, filtered by the filter circuit and then sent into the SCM compensation circuit. During the SCM compensation circuit, the voltage signal is compensated in null, sensitivity and linearity and then transferred into a new angular velocity signal. The linear dimension angular velocity gyroscope is able to output an one-way angular velocity signal.

Figure 12:
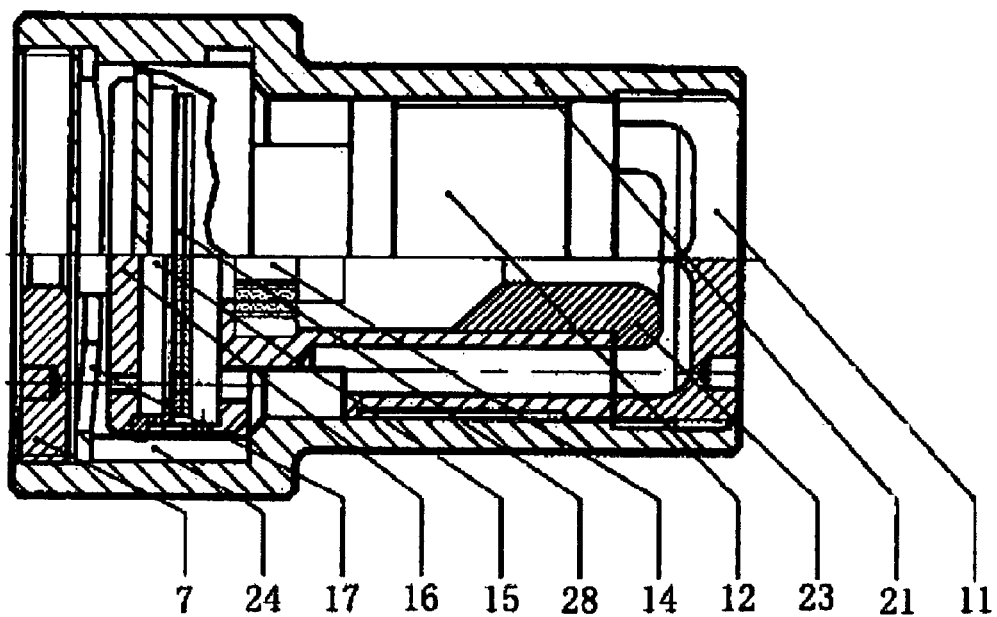
FIG. 12 is a perspective view of an gas flow angular velocity sensing element according to above present invention.
Figure 13:
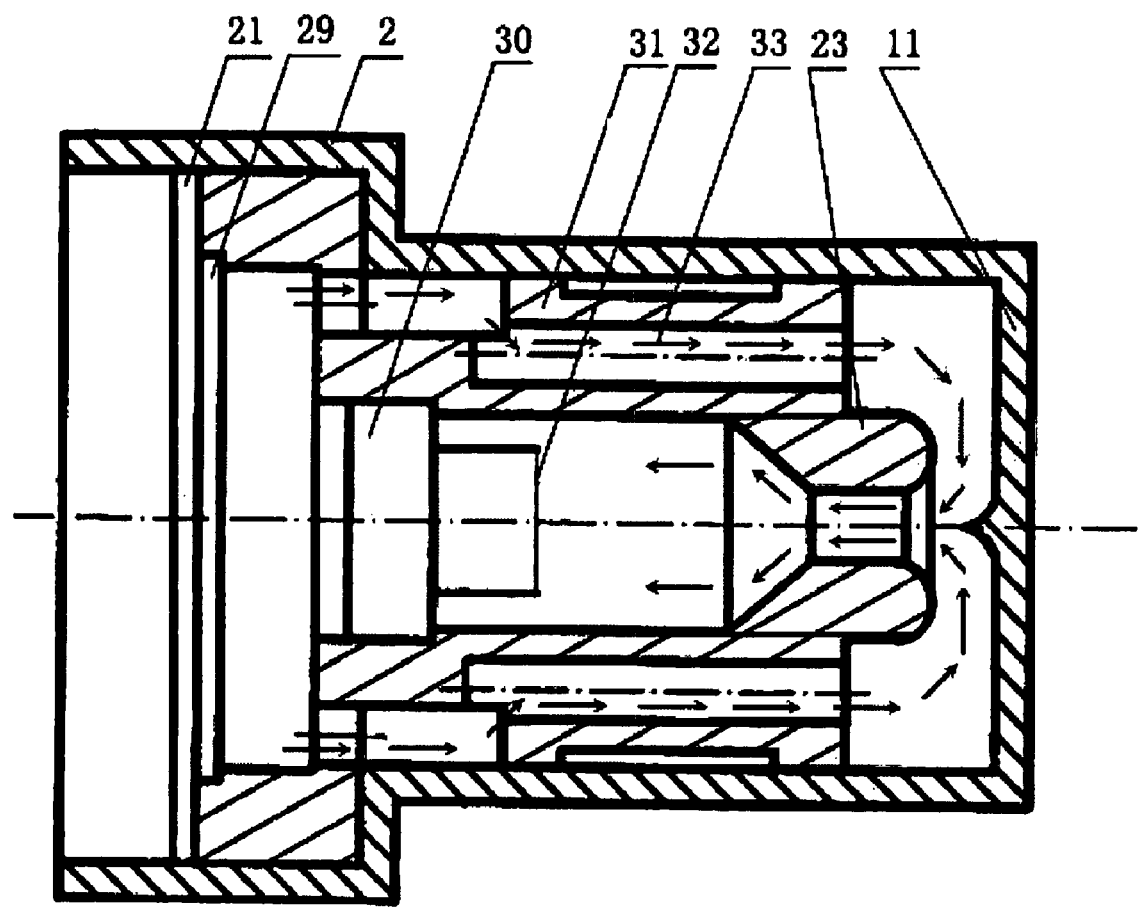
FIG. 13 is a perspective view of an gas flow channel of the gas flow angular velocity sensing element according to above present invention.

The linear dimension gas flow angular velocity sensing element mainly comprises a top cap, a positioning key, a disk spring, a pump base, a pump bracket, a piezoelectric pump (comprising a piezoelectric ceramics twin lamella attached to the pump bracket), a heat-variable plug, a nozzle body, a nozzle and a housing, as shown in FIG. 12 of the drawings. A pair of heat resistance wires is parallel welded on the heat-variable plug. The working gas is driven to flow in the sensing element. Once an angular velocity signal is inputted, the working gas will bias to a suitable angle with respect to the center of the pair of heat resistance wires. Hence, the cool-down time of the two heat resistance wires is different. Next, a resistance change of the two heat resistance wires is detected by a bridge circuit. The resistance change and the angular velocity is in a direct ratio. According to the theory and shown in the experiment, a turbulent flow can not be formed in a streamline gas flow channel of the sensing element. Hence, the gas pendulum recycle in the streamline gas flow channel of the sensing element is stability such that the sensor can achieve well performance. Shown in the experiment, a well performance sensor is obtained if the gas flow channel is in a mechanical structure as shown in FIG. 13 of the drawings. (shown in Chart. 2).

CHART 2

Main performance indictors of linear dimension gas flow angular velocity sensor

| Measure Range | Distinguish Ability | Ratio Quotient | Non-Linearity (% FS) | Response Time (ms) | Working Temperature (° C.) |
|---|---|---|---|---|---|
| ±120°/S | 0.01°/S | 80 mV/°/S | ≦1% | ≦100 | −40~60 |

Figure 14:
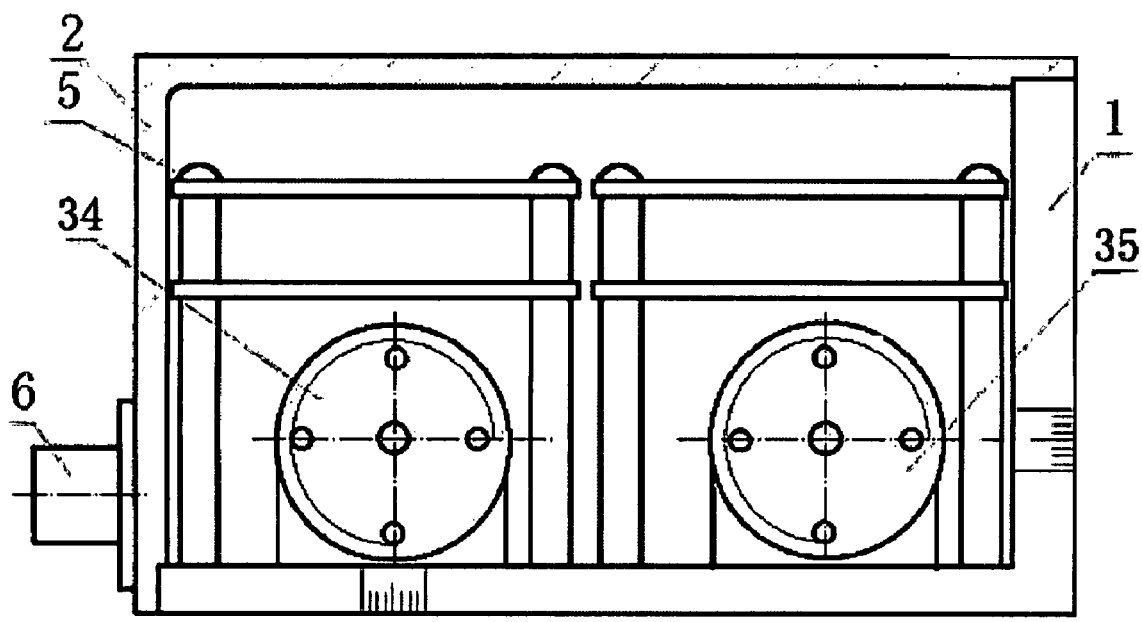
FIG. 14 is a perspective view of a two dimension gas flow angular velocity gyroscope according to above present invention.

Referring to the FIG. 14 of the drawings, the two dimension angular velocity gyroscope mainly comprises a base, a housing, a X-axis gas flow angular velocity sensing element, a Y-axis gas flow angular velocity sensing element, a signal process circuit and a plug. The signal process circuit mainly comprises a bridge circuit, an amplify circuit, a filter circuit, and a SCM compensation circuit. The angular velocity signals from X-axis and Y-axis gas flow angular velocity sensing element are transferred to a voltage signal by a bridge circuit, amplified by the amplify circuit, and filtered by the filter circuit and then sent into the SCM compensation circuit. During the SCM compensation circuit, each of the voltage signals from X-axis and Y-axis gas flow angular velocity sensing element is compensated in null, sensitivity and linearity and then transferred into a new angular velocity signal. The two dimension angular velocity gyroscope is able to output X-axis and Y-axis angular velocity signals respectively. Moreover, the two dimension angular velocity gyroscope has advantages like integral design, compact volume and lower power consumption.

Referring to the FIG. 15 of the drawings, four rectangle disks are inlaid in the nozzle to make the working gas distribute in several layers to hold the working gas in a stable state. Therefore, concussion phenomenon of the sensor output is avoided and the sensor is able to work in a stable state. Shown in the experiment, disk-shape nozzle makes the null change of the sensor less than or equate from 10% to 0.2% such that the sensor can achieve well performance. (shown in Chart. 3).

Figure 16:
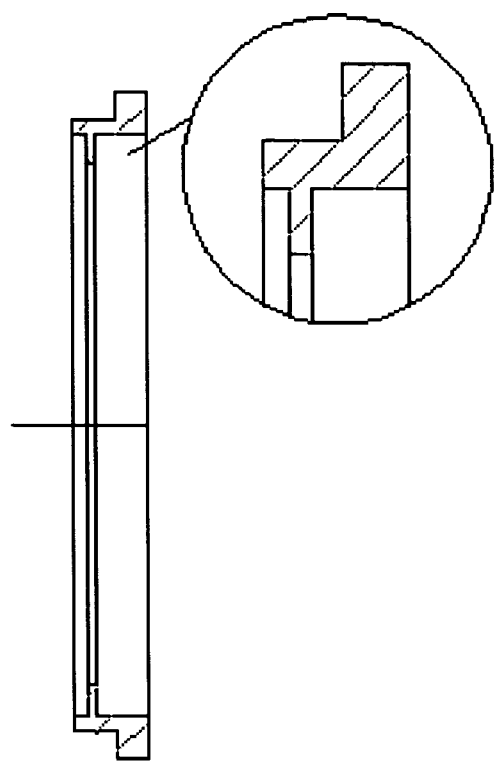
FIG. 16 is a cross section view of a pump bracket according to above present invention.

The piezoelectric pump is drive source to make the working gas circulate in the gas flow channel. For enhancing the couple effect of the piezoelectric pump, the boundary of the piezoelectric pump is simply designed because of the simply designed boundary has advantage like lightweight and firm structure, and least mechanic dissipation. Shown in the experiment, referring to FIG. 16 of the drawings, a simply designed boundary of the piezoelectric pump is shown, which is able to raise the piezoelectric sensitivity by 50%.

Figure 17:
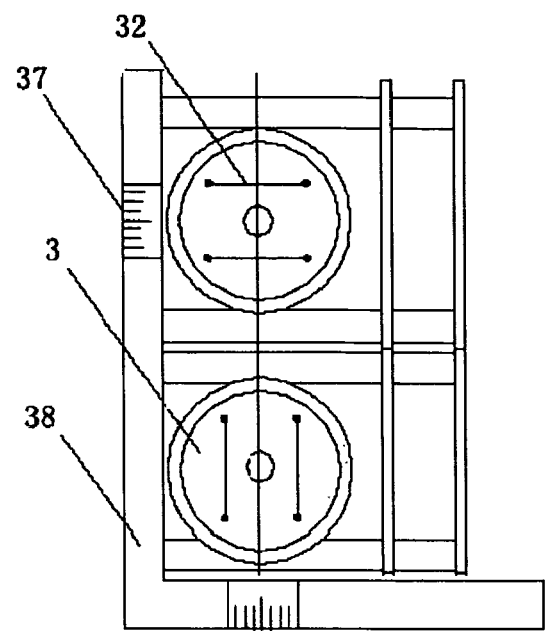
FIG. 17 is a perspective view of an "L" shaped locating base of the two dimension gas flow angular velocity gyroscope according to above present invention.

Referring to the FIG. 17 of the drawings, two dimension angular velocity sensing elements are vertically mounted on the "L" shaped base. The "L" shaped base further comprises a pair of bottom board perpendicular to each other. And the hot resistance wires are parallel provided on the bottom board of the "L" shaped base. Shown in the experiment, this kind of space configuration between the two linear dimension angular velocity sensing elements is able to reduce the cross couple rate from 3% to 1%.

CHART 3

Main performance indictors of two dimension gas flow angular velocity sensor

| Measure Range | Dis-tinguish Ability | Ratio Quotient | Non-Linearity (% FS) | Response Time (ms) | Working Temperature (° C.) |
|---|---|---|---|---|---|
| ±45°/S | 0.01°/S | 40 mV/°/S | ≦1% | ≦100 | −40~60 |

The gas pendulum horizontal pose sensor adopted by the gas pendulum inertial sensor comprises a linear gas pendulum horizontal pose sensor, a two dimension gas pendulum horizontal pose sensor and an omnibearing gas pendulum horizontal pose sensor.

Figure 18:
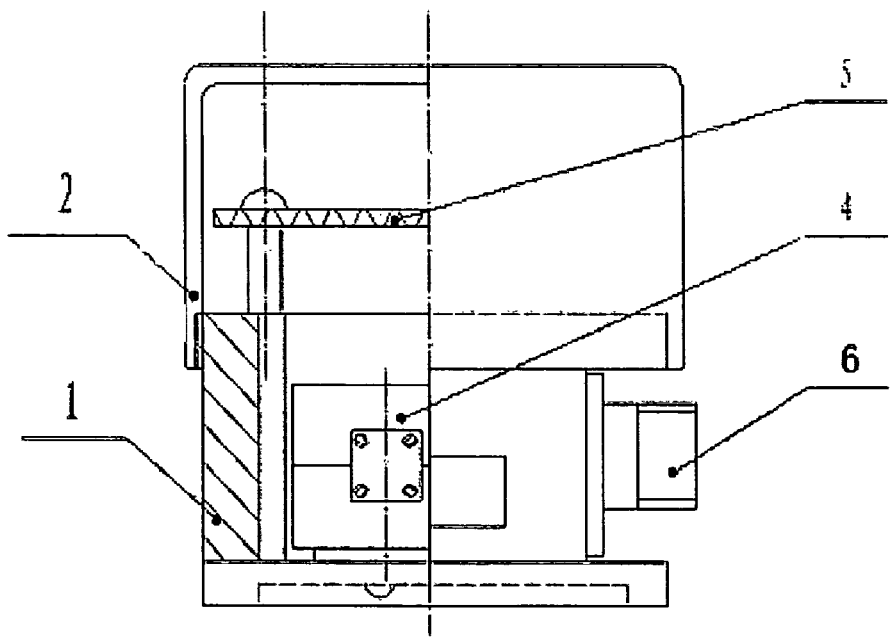
FIG. 18 is a perspective view of a linear dimension gas pendulum horizontal pose sensor according to above present invention.

The linear gas pendulum horizontal pose sensor mainly comprises a base, a housing, a plug, a linear gas pendulum tilt sensing element and a signal process circuit, as shown in FIG. 18. The signal process circuit comprises a bridge circuit, a amplify circuit, a filter circuit and a SCM compensation circuit. Once a tilt signal is input, the input tilt is transferred into a voltage signal. The voltage signal, then, is amplified by the amplify circuit and filtered by the filter circuit. Finally, the voltage signal is sent to the SCM compensation circuit. To compensate the tilt signal with the null position, the sensitivity and linearity, the SCM compensation circuit outputs a new tilt signal.

Figure 19:
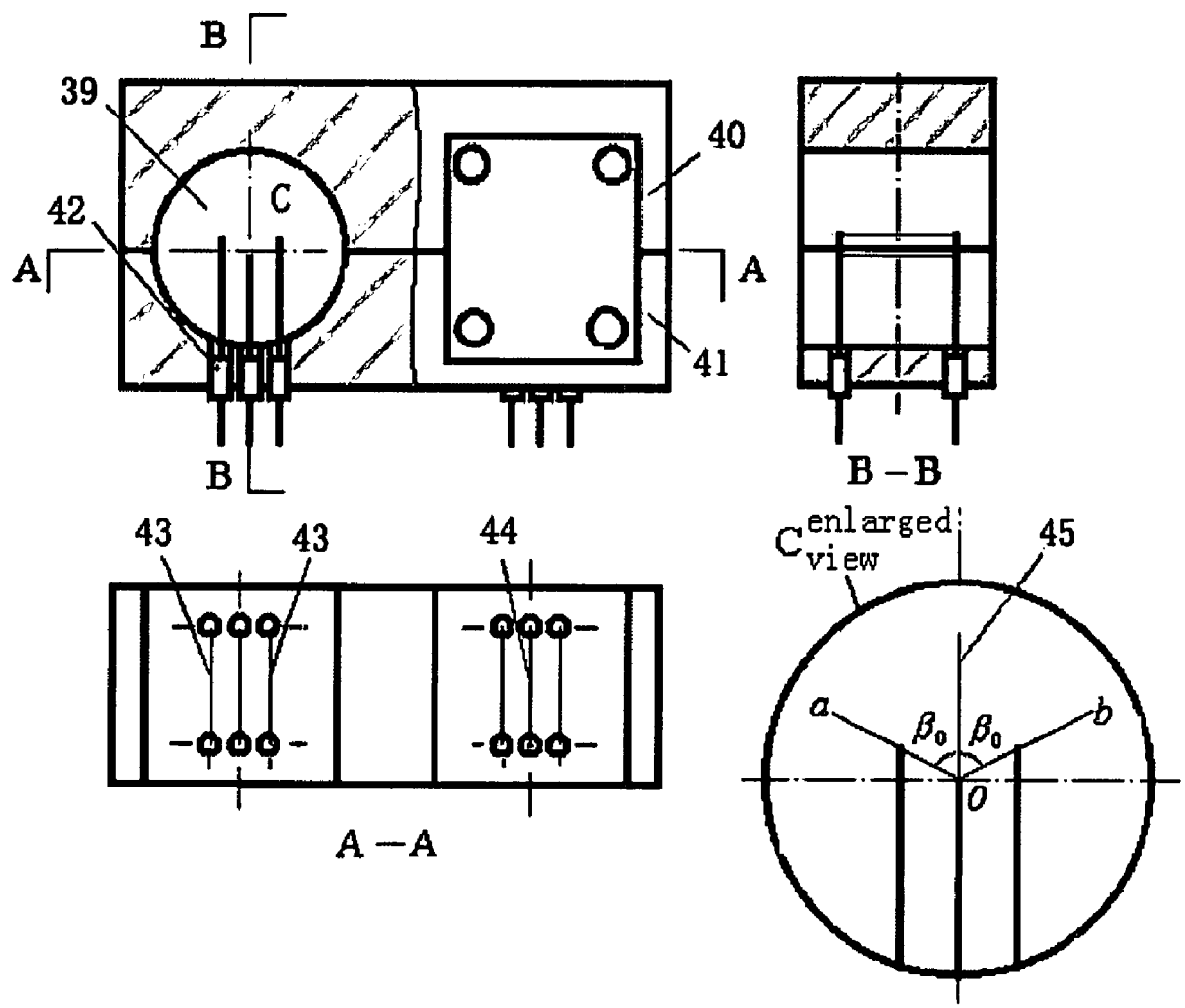
FIG. 19 is a structure diagram of a linear dimension gas pendulum tilt sensing element according to above present invention.

The basic structure principle of the tilt sensing element is shown as FIG. 19 of the drawings. The tilt sensing element is in a double-chamber and six-wired structure. The tilt sensing element comprises a pair of cylinder sealed chambers, wherein each of the pair of cylinder sealed chambers comprises a body and a pair of end caps mounted to the body respectively. In each cylinder sealed chamber, three insulators are provided on the axial line of the cylinder sealed chamber at each of the pair of end caps of the circular sealed chambers respectively. Three hot resistance wires are respectively welded on each of three insulators. One of the three hot resistance wires, a heat resistance wire, is mounted at the axial line of the circular sealed chamber, and the other two hot resistance wires are symmetrically placed in each side of the heat resistance wire, spot a and spot b. In work, the heat resistance wire is heated as constant current go through, and the other two hot resistance wires are used as detecting arms. When the circular sealed chamber of the sensing element is tilt with respect to the horizon level, the temperature of the hot resistance wires is changed, and the resistance of the hot resistance wires is also changed accordingly. The electric bridge circuit loses of balance, and the output data from the electric bridge circuit changes with the tilt in a direct ratio. The sensor, adopted the tilt sensing element is in a double-chamber and six-wired structure, has a sensitivity twice time than before, shown in Chart. 4.

CHART 4

Main performance indictors of linear dimension gas pendulum horizontal pose sensor

| Measure Range | Dis-tinguish Ability | Ratio Quotient | Non-Linearity (% FS) | Response Time (ms) | Working Temperature (° C.) |
|---|---|---|---|---|---|
| ±45° | 0.01° | 100 mV/° | ≦0.5% | ≦100 | −40~60 |

Figure 20:
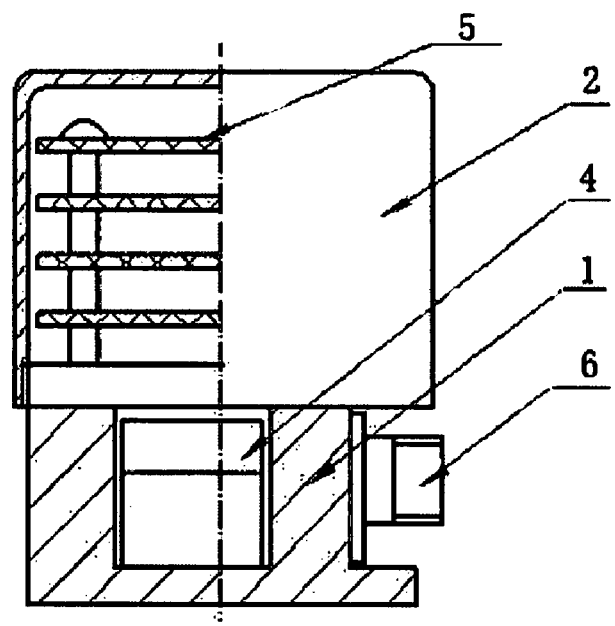
FIG. 20 is a perspective view of a two dimension gas pendulum horizontal pose sensor according to above present invention.

The two dimension gas pendulum horizontal pose sensor, which is able to output a tile with respect to a X-axis and a Y-axis direction, referring to FIG. 20 of the drawings, comprises a housing, a base, a X-axis gas pendulum tilt sensing element, a Y-axis gas pendulum tilt sensing element, a signal process circuit and a plug. The signal process circuit mainly comprises a bridge circuit, an amplify circuit, a filter circuit, and a SCM compensation circuit.

The angular velocity signals from X-axis and Y-axis gas flow angular velocity sensing element are transferred to a voltage signal by a bridge circuit, amplified by the amplify circuit, and filtered by the filter circuit and then sent into the SCM compensation circuit. During the SCM compensation circuit, each of the voltage signals from X-axis and Y-axis gas flow angular velocity sensing element is compensated in null, sensitivity and linearity and then transferred into a new angular velocity signal. The two dimension angular velocity gyroscope is able to output X-axis and Y-axis angular velocity signals respectively. Moreover, the two dimension angular velocity gyroscope has advantages like integral design, compact volume and lower power consumption.

Figure 21:
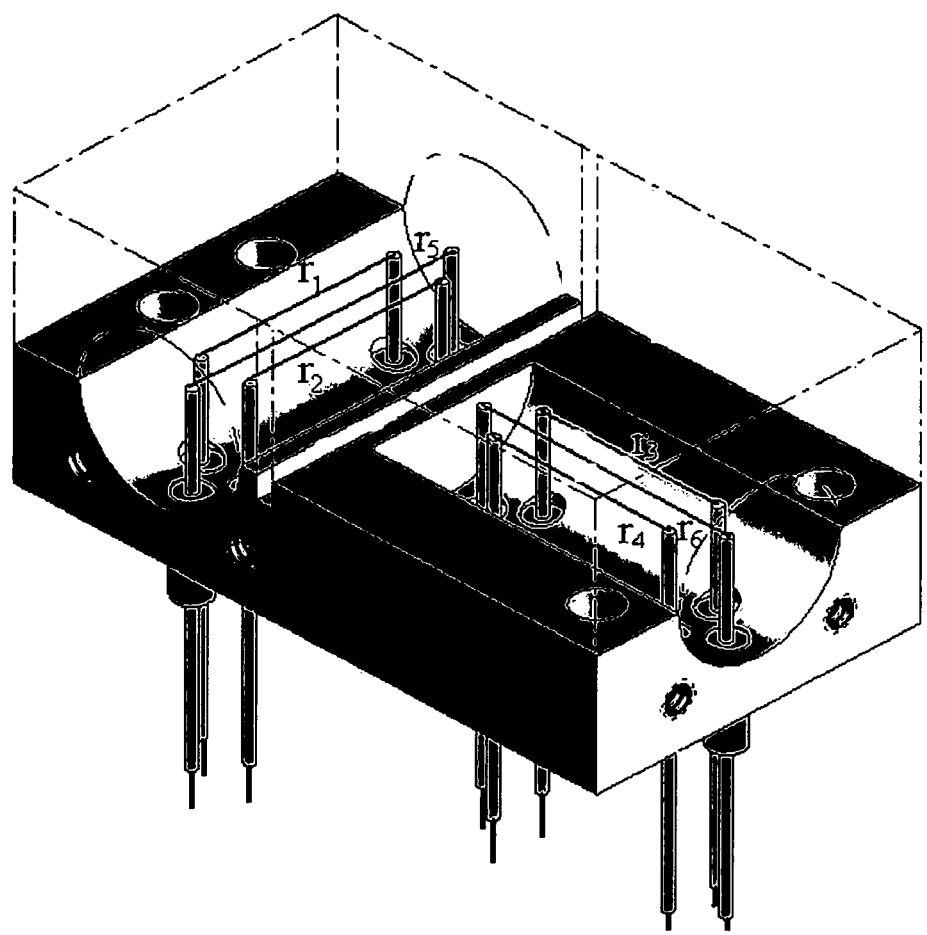
FIG. 21 is a perspective view of the two dimension gas pendulum tilt sensing element according to above present invention.
Figure 22:
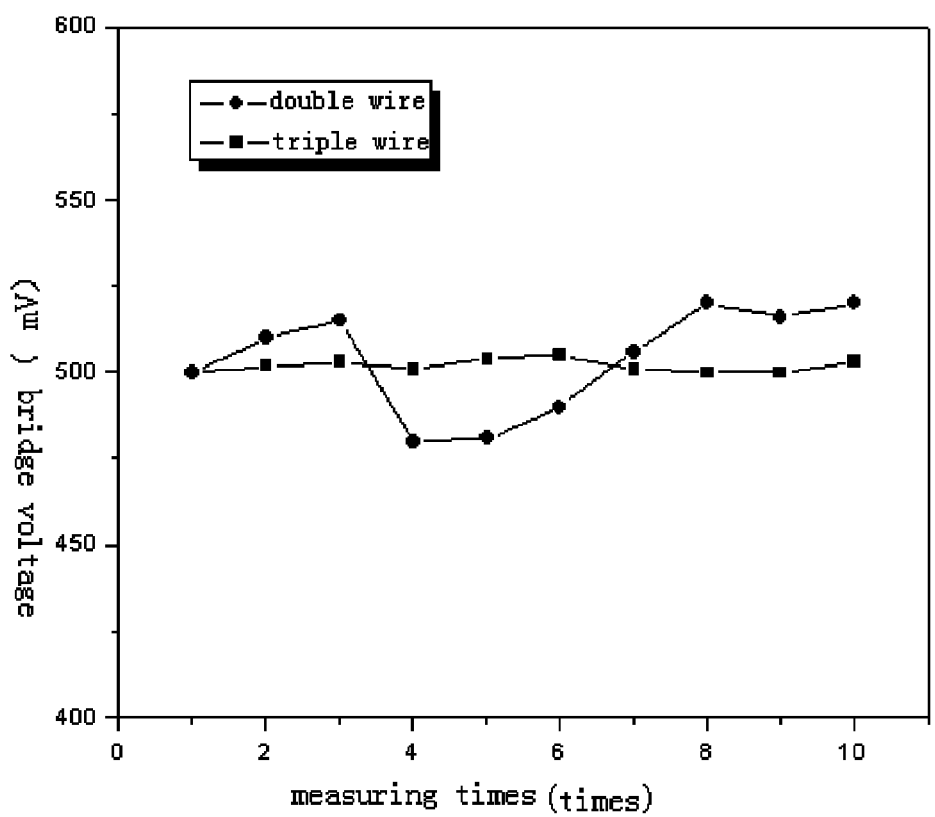
FIG. 22 is a perspective view illustrates the different between a double wire structure and a triple wire structure of the gas pendulum inertial sensor when tilt degree is 5°.

Referring to FIG. 21 of the drawings, the two dimension tilt sensing element is in a double-chamber and three-wired structure. The tilt sensing element comprises a pair of cylinder sealed chambers, independent and perpendicular provided with each other, and a chase mortise provided to connect the two independent cylinder sealed chambers but effectively isolate the independent cylinder sealed chambers to avoid cross couple therebetween. As the two cylinder sealed chambers are respectively corresponding with X-axis and Y-axis, their sizes must be keep in conformity to ensure the compatibility between X-axis and Y-axis. R5, r6 are two heater wires in the sealed chamber to make the working flow in the sealed chamber to achieve contra-flow. Heater wires r1, r2 and r3, r4 are respectively used as detecting wires for detecting temperature change along the tilt with respect to X-axis and Y-axis. A well sensitivity is achieved by adjust the working current in a lower range. The heater wires and the detecting wires are separated provided in the chamber. By this way, the sensor will achieve a well stability and a high sensitivity. At the same time, the working current is reduced from 80 mA to 40 mA. From FIG. 22 of the drawings, we can learn, when same sensitivity is achieved, the two dimension tilt sensing element in a double-chamber and three-wired structure is much better than that in a double-chamber and two-wired structure in performance. The main performance of the sensor is shown in Chart. 5.

CHART 5

Main performance indictors of two dimension gas pendulum horizontal pose sensor

| Measure Range | Distinguish Ability | Ratio Quotient | Non-Linearity (% FS) | Response Time (ms) | Working Temperature (° C.) |
|---|---|---|---|---|---|
| ±45° | 0.01° | 100 mV/° | ≦1% | ≦100 | −40~60 |

Figure 23:
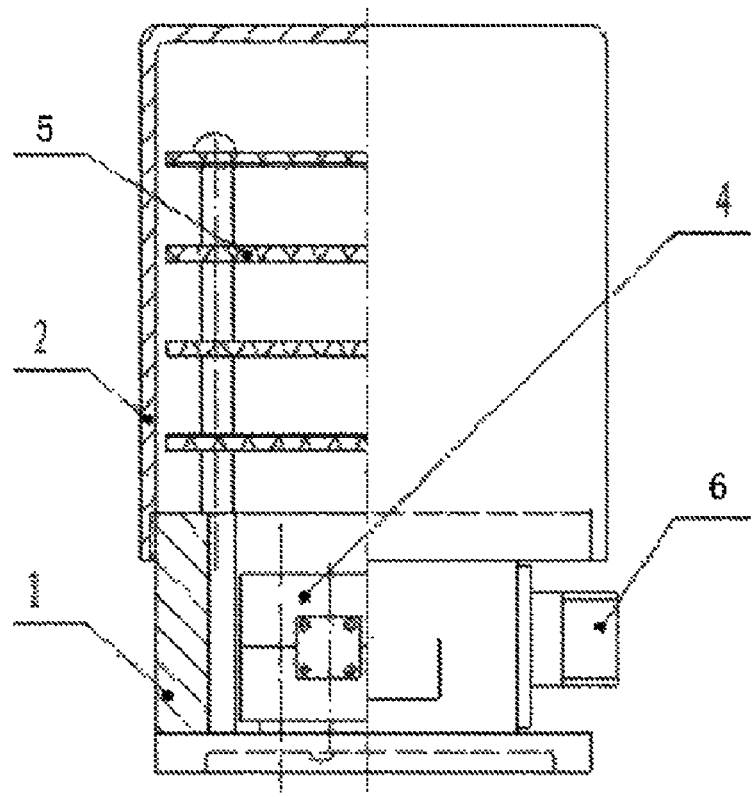
FIG. 23 is a perspective view of an omnibearing gas pendulum horizontal pose sensor according to above present invention.

The omnibearing gas pendulum horizontal pose sensor is able to achieve an omnibearing horizontal pose measurement to a motional body, and gives an omnibearing measure result such as floating mark. Referring to FIG. 23 of the drawings, the omnibearing gas pendulum horizontal pose sensor comprises a base, a housing, a signal process circuit, a sensing element and a plug. The sensing element sends a X-axis tilt signal and a Y-axis tilt signal. By compositing the X-axis tilt signal and the Y-axis tilt signal together, actual horizontal pose information is achieved. A signal, output from a signal amplifier of the signal process circuit, is sent to a SCM, which has a data process program to achieve the motional body's omnibearing tilt signal.

Figure 24:
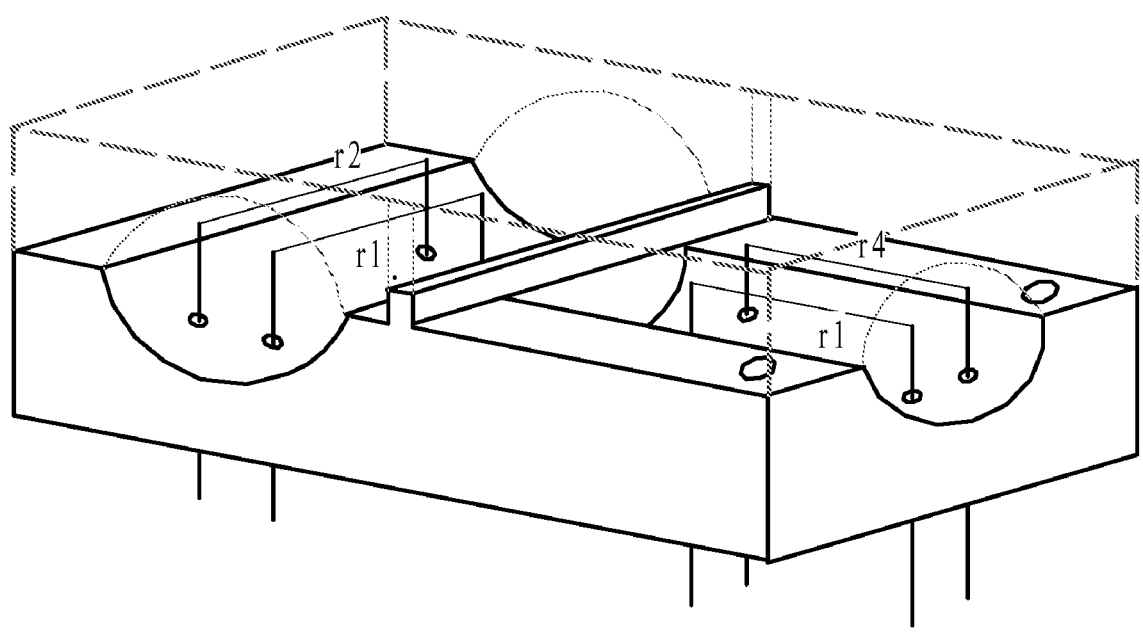
FIG. 24 is a perspective view of an omnibearing gas pendulum horizontal pose sensing element according to above present invention.

Referring to FIG. 24 of the drawings, the omnibearing gas pendulum horizontal pose sensor is in a double-chamber and double-wire structure. The omnibearing gas pendulum horizontal pose sensor comprises two "T" shaped gas contra-flow circular chambers, each with a heat source and a pyrometric filament, and two heat wires disposed in the gas contra-flow circular chambers in a "T" type. A X-axis line and a Y-axis line are provided to define a reference axis to ensure the two gas contra-flow circular chambers independent and perpendicular with each other to make sure that the heat wires in the gas contra-flow circular chambers is able to accurately and independently measure the tilt degree of the chambers. By compositing the X-axis tilt signal and the Y-axis tilt signal together, omnibearing tilt information is achieved.

The omnibearing gas pendulum horizontal pose sensor of double-chamber and double-wire structure has a simply produce process. The chamber could be designed in an elongate and thin shape. The heat wire is slender and placed in the axis line of the chamber. Much longer the heat wire is, better heat interchange effort is achieved. Hence, the present invention provides the elongate heat wire to detect the temperature change in the chamber, and the sensitivity and distinguish ability of the sensing element is twice as before. The main performance of the sensor is shown in Chart. 6.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A gas pendulum inertial sensor, comprising:
   a base;
   a housing;
   a plug;
   a gas pendulum tilt sensor comprising a gas pendulum tilt sensing element;
   an angular velocity gyroscope; and
   a signal process circuit comprising a bridge circuit, an amplify circuit, a filter circuit, and a SCM compensation circuit having a null position and sensitivity compensation program, a linearity and output compensation program, an acceleration interference offset subprogram, and an omnibearing tilt signal compensation program for achieving an omnibearing horizontal pose measurement.

2. The gas pendulum inertial sensor, as recited in claim 1, wherein said null position and sensitivity compensation program and said linearity and output compensation program are shared by said gas pendulum tilt sensor and said angular velocity gyroscope.

3. The gas pendulum inertial sensor, as recited in claim 2, wherein said SCM compensation circuit executes amplification, filtration, and data compensation process to substitute for a conventional signal amplify circuit, filter circuit and compensation process, and combines four conventional circuits into one, so as to reduce volume of said gas pendulum inertial sensor, eliminate impaction from independent circuits, and reduce zero shift error.

4. The gas pendulum inertial sensor, as recited in claim 1, wherein said gas pendulum tilt sensing element is a linear dimension gas pendulum tilt sensing element, wherein said linear dimension gas pendulum tilt sensing element is in a double-chamber and six-wired structure, comprising:
   a pair of cylinder sealed chambers, wherein each of said pair of cylinder sealed chambers comprises a body and a pair of end caps mounted to said body respectively,

CHART 6

Main performance indictors of omnibearing gas pendulum horizontal pose sensor

| Measure Range | Distinguish Ability | Ratio Quotient | Non-Linearity (% FS) | Response Time (ms) | Working Ttemperature (° C.) |
|---|---|---|---|---|---|
| Tilt degree: 0 ~ 20°; Azel degree: 0 ~ 360° | Two dimension: 0.01°; omnibearing: 0.2° | 100 mV/° | ≦1% | ≦100 | −40~65 | three insulators provided on an axial line of said cylinder sealed chamber at each of said pair of end caps of said cylinder sealed chambers respectively, and three hot resistance wires respectively welded between said three insulators at each of said pair of end caps in each of said pair of cylinder sealed chambers, such that totally six said hot resistance wires are welded between twelve said insulators, wherein one of said three hot resistance wires, a heat resistance wire, is mounted at said axial line of said cylinder sealed chamber, and the other two hot resistance wires are symmetrically placed in each side of said heat resistance wire, wherein in work, said heat resistance wire is heated as constant current go through, and the other two hot resistance wires are used as detecting arms.

5. The gas pendulum inertial sensor, as recited in claim 3, wherein said gas pendulum tilt sensing element is a linear dimension gas pendulum tilt sensing element, wherein said linear dimension gas pendulum tilt sensing element is in a double-chamber and six-wired structure, comprising:

a pair of cylinder sealed chambers, wherein each of said pair of cylinder sealed chambers comprises a body and a pair of end caps mounted to said body respectively, three insulators provided on an axial line of said cylinder sealed chamber at each of said pair of end caps of said cylinder sealed chambers respectively, and three hot resistance wires respectively welded between said three insulators at each of said pair of end caps in each of said pair of cylinder sealed chambers, such that totally six said hot resistance wires are welded between twelve said insulators, wherein one of said three hot resistance wires, a heat resistance wire, is mounted at said axial line of said cylinder sealed chamber, and the other two hot resistance wires are symmetrically placed in each side of said heat resistance wire, wherein in work, said heat resistance wire is heated as constant current go through, and the other two hot resistance wires are used as detecting arms.

6. The gas pendulum inertial sensor, as recited in claim 1, wherein said gas pendulum tilt sensing element is a two dimension gas pendulum tilt sensing element, wherein said two dimension gas pendulum tilt sensing element is in a double-chamber and three-wired structure, comprising a pair of cylinder sealed chambers, independently and perpendicularly provided with each other, and a chase mortise provided to connect said pair of cylinder sealed chambers and effectively isolate said cylinder sealed chambers to avoid cross couple therebetween, wherein one of said cylinder sealed chambers comprises three heat resistance wires $r1$, $r2$, $r5$, and the other of said cylinder sealed chambers comprises three heat resistance wires $r3$, $r4$, $r6$, wherein said heat resistance wires $r5$ and $r6$ are heater wires for achieving contra-flow of working gas in said cylinder sealed chamber respectively, and said heat resistance wires $r1$, $r2$, $r3$ and $r4$ are respectively used as detecting wires for detecting temperature change along tilt of two dimensions.

7. The gas pendulum inertial sensor, as recited in claim 3, wherein said gas pendulum tilt sensing element is a two dimension gas pendulum tilt sensing element, wherein said two dimension gas pendulum tilt sensing element is in a double-chamber and three-wired structure, comprising a pair of cylinder sealed chambers, independently and perpendicularly provided with each other, and a chase mortise provided to connect said pair of cylinder sealed chambers and effectively isolate said cylinder sealed chambers to avoid cross couple therebetween, wherein one of said cylinder sealed chambers comprises three heat resistance wires $r1$, $r2$, $r5$, and the other of said cylinder sealed chambers comprises three heat resistance wires $r3$, $r4$, $r6$, wherein said heat resistance wires $r5$ and $r6$ are heater wires for achieving contra-flow of working gas in said cylinder sealed chamber respectively, and said heat resistance wires $r1$, $r2$, $r3$ and $r4$ are respectively used as detecting wires for detecting temperature change along tilt of two dimensions.

8. The gas pendulum inertial sensor, as recited in claim 1, wherein said gas pendulum tilt sensing element is an omnibearing gas pendulum tilt sensing element, wherein said omnibearing gas pendulum tilt sensing element is in a double-chamber and double-wire structure, comprising two gas contra-flow circular chambers in a "T" shaped structure, each with a heat source and a pyrometric filament, and two heat wires disposed in said gas contra-flow circular chambers in said "T" shaped, wherein said two gas contra-flow circular chambers are independent and perpendicular to each other to make sure that said heat wires in said gas contra-flow circular chambers are able to accurately and independently measure tilt degree of said gas contra-flow circular chambers.

9. The gas pendulum inertial sensor, as recited in claim 3, wherein said gas pendulum tilt sensing element is an omnibearing gas pendulum tilt sensing element, wherein said omnibearing gas pendulum tilt sensing element is in a double-chamber and double-wire structure, comprising two gas contra-flow circular chambers in a "T" shaped structure, each with a heat source and a pyrometric filament, and two heat wires disposed in said gas contra-flow circular chambers in said "T" shaped, wherein said two gas contra-flow circular chambers are independent and perpendicular to each other to make sure that said heat wires in said gas contra-flow circular chambers are able to accurately and independently measure tilt degree of said gas contra-flow circular chambers.

10. The gas pendulum inertial sensor, as recited in claim 1, wherein said angular velocity gyroscope comprises a linear dimension gas flow angular velocity sensing element, wherein said linear dimension gas flow angular velocity sensing element comprises a top cap, a positioning key, a disk spring, a pump base, a pump bracket, a piezoelectric pump comprising a piezoelectric ceramics twin lamella attached to said pump bracket, a heat-variable plug, a nozzle body, a nozzle and a housing, wherein a pair of heat resistance wires is parallelly welded on said heat-variable plug, said piezoelectric pump drives working gas to flow in said linear dimension gas flow angular velocity sensing element, so that once an angular velocity signal is inputted, the working gas biases to a suitable angle with respect to a center of said pair of heat resistance wires, and said bridge circuit detects a resistance change of said pair of heat resistance wires.

11. The gas pendulum inertial sensor, as recited in claim 3, wherein said angular velocity gyroscope comprises a linear dimension gas flow angular velocity sensing element, wherein said linear dimension gas flow angular velocity sensing element comprises a top cap, a positioning key, a disk spring, a pump base, a pump bracket, a piezoelectric pump comprising a piezoelectric ceramics twin lamella attached to said pump bracket, a heat-variable plug, a nozzle body, a nozzle and a housing, wherein a pair of heat resistance wires is parallelly welded on said heat-variable plug, said piezoelectric pump drives working gas to flow in said linear dimension gas flow angular velocity sensing element, so that once an angular velocity signal is inputted, the working gas biases to a suitable angle with respect to a center of said pair of heat resistance wires, and said bridge circuit detects a resistance change of said pair of heat resistance wires.

12. The gas pendulum inertial sensor, as recited in claim 10, wherein said housing of said linear dimension gas flow angular velocity sensing element has a gas inlet and a gas outlet respectively provided on both sides of said housing of said linear dimension gas flow angular velocity sensing element, wherein a gas inlet valve is mounted at said gas inlet and a gas outlet valve is mounted at said gas outlet, wherein a pair of seal grooves are provided at both sides of said housing of said linear dimension gas flow angular velocity sensing element respectively, a "π" shaped press plate is closely mounted on each of said pair of seal grooves and a pair of seal rings are respectively placed between said seal grooves for achieving better seal effect.

13. The gas pendulum inertial sensor, as recited in claim 11, wherein said housing of said linear dimension gas flow angular velocity sensing element has a gas inlet and a gas outlet respectively provided on both sides of said housing of said linear dimension gas flow angular velocity sensing element, wherein a gas inlet valve is mounted at said gas inlet and a gas outlet valve is mounted at said gas outlet, wherein a pair of seal grooves are provided at both sides of said housing of said linear dimension gas flow angular velocity sensing element respectively, a "π" shaped press plate is closely mounted on each of said pair of seal grooves and a pair of seal rings are respectively placed between said seal grooves for achieving better seal effect.

14. The gas pendulum inertial sensor, as recited in claim 10, wherein a boundary of said piezoelectric pump of said linear dimension gas flow angular sensing element is a simply designed boundary.

15. The gas pendulum inertial sensor, as recited in claim 11, wherein a boundary of said piezoelectric pump of said linear dimension gas flow angular sensing element is a simply designed boundary.

16. The gas pendulum inertial sensor, as recited in claim 10, wherein said nozzle of said linear dimension gas flow angular velocity sensing element is in a disk shaped, said linear dimension gas flow angular velocity sensing element further comprises four rectangle disks inlaid in said nozzle.

17. The gas pendulum inertial sensor, as recited in claim 11, wherein said nozzle of said linear dimension gas flow angular velocity sensing element is in a disk shaped, said linear dimension gas flow angular velocity sensing element further comprises four rectangle disks inlaid in said nozzle.

18. The gas pendulum inertial sensor, as recited in claim 10, wherein said linear dimension gas flow angular velocity sensing element has a streamline shape gas flow channel.

19. The gas pendulum inertial sensor, as recited in claim 11, wherein said linear dimension gas flow angular velocity sensing element has a streamline shape gas flow channel.

20. The gas pendulum inertial sensor, as recited in claim 1, wherein said angular velocity gyroscope is a two dimension angular velocity gyroscope, comprising: a "L" shaped base comprising a bottom board, an X-axis gas flow angular velocity sensing element, and a Y-axis gas flow angular velocity sensing element, wherein said X-axis gas flow angular velocity sensing element and said Y-axis gas flow angular velocity sensing element are vertically mounted on said "L" shaped base with each other, and respectively comprise a heat-variable plug and two hot resistance wires parallelly welded on said heat-variable plug, wherein said hot resistance wires are perpendicularly provided on said bottom board of said "L" shaped base.

* * * * *